(12) United States Patent
Shinmoto et al.

(10) Patent No.: US 9,123,456 B2
(45) Date of Patent: Sep. 1, 2015

(54) HIGH FREQUENCY CABLE, HIGH FREQUENCY COIL AND METHOD FOR MANUFACTURING HIGH FREQUENCY CABLE

(71) Applicants: Takashi Shinmoto, Noda (JP); Shotaro Yoshida, Edogawa-ku (JP); Shinji Katayama, Numazu (JP); Taikou Toda, Hamamatsu (JP); Takamasa Kato, Chiba (JP); Masanori Daibo, Sakura (JP); Akio Kawakami, Numazu (JP)

(72) Inventors: Takashi Shinmoto, Noda (JP); Shotaro Yoshida, Edogawa-ku (JP); Shinji Katayama, Numazu (JP); Taikou Toda, Hamamatsu (JP); Takamasa Kato, Chiba (JP); Masanori Daibo, Sakura (JP); Akio Kawakami, Numazu (JP)

(73) Assignee: FUJIKURA LTD., Tokyo (JP)

( * ) Notice: Subject to any disclaimer, the term of this patent is extended or adjusted under 35 U.S.C. 154(b) by 81 days.

(21) Appl. No.: 13/624,395

(22) Filed: Sep. 21, 2012

(65) Prior Publication Data
US 2013/0014973 A1 Jan. 17, 2013

Related U.S. Application Data

(63) Continuation of application No. PCT/JP2011/056984, filed on Mar. 23, 2011.

(30) Foreign Application Priority Data

Mar. 23, 2010 (JP) .................................. 2010-066793

(51) Int. Cl.
*H01B 5/02* (2006.01)
*H01B 13/06* (2006.01)
(Continued)

(52) U.S. Cl.
CPC ................ *H01B 13/06* (2013.01); *B32B 15/01* (2013.01); *C22C 9/00* (2013.01); *C22C 21/00* (2013.01);
(Continued)

(58) Field of Classification Search
CPC ............. H02K 3/00; H02K 3/02; H02K 3/03; H02K 3/04; B23K 9/04; B23K 9/23; B23K 35/30; B23K 35/368; B21C 33/004
USPC ............................................ 174/126.1, 126.2
See application file for complete search history.

(56) References Cited

U.S. PATENT DOCUMENTS

| | | | | |
|---|---|---|---|---|
| 3,096,577 A | * | 7/1963 | Carlson et al. | 228/118 |
| 4,013,211 A | * | 3/1977 | Atman | 228/126 |
| 6,178,623 B1 | * | 1/2001 | Kitazawa et al. | 29/825 |

FOREIGN PATENT DOCUMENTS

| CN | 101202130 | * | 6/2008 | ................ B21C 1/00 |
|---|---|---|---|---|
| CN | 101202130 A | | 6/2008 | |

(Continued)

OTHER PUBLICATIONS

Bonding mechanism, microstructure and properties of the bimetallic wires by clad-drawing, Yong Qing et al., 2009.*

(Continued)

*Primary Examiner* — Timothy Thompson
*Assistant Examiner* — Paresh Paghadal
(74) *Attorney, Agent, or Firm* — Sughrue Mion, PLLC

(57) ABSTRACT

A high frequency cable includes: a central conductor made from aluminum or an aluminum alloy; a covering layer made from copper covering the central conductor, and having a fiber-like structure in a longitudinal direction; and an intermetallic compound layer formed between the central conductor and the covering layer and having greater volume resistivity than the covering layer, wherein a cross-sectional area of the covering layer is 15% or less of an entire cross-sectional area including the central conductor, the intermetallic compound layer and the covering layer.

5 Claims, 18 Drawing Sheets

(51) Int. Cl.
*B32B 15/01* (2006.01)
*C22C 9/00* (2006.01)
*C22C 21/00* (2006.01)
*C23C 28/02* (2006.01)
*H01F 27/28* (2006.01)
*H01B 7/30* (2006.01)
*H01B 1/02* (2006.01)

(52) U.S. Cl.
CPC .............. *C23C 28/023* (2013.01); *H01B 1/023* (2013.01); *H01B 1/026* (2013.01); *H01B 5/02* (2013.01); *H01B 7/30* (2013.01); *H01F 27/2823* (2013.01); *Y10T 29/49117* (2015.01)

(56) References Cited

FOREIGN PATENT DOCUMENTS

| | | | |
|---|---|---|---|
| JP | 54-155915 A | 12/1979 | |
| JP | 60-125357 A | 7/1985 | |
| JP | 62-76216 A | 4/1987 | |
| JP | 62-263978 A | 11/1987 | |
| JP | S62263978 | * 11/1987 | .............. B32B 15/01 |
| JP | 04-171609 A | 6/1992 | |
| JP | 4-230905 A | 8/1992 | |
| JP | 8-197281 A | 8/1996 | |
| JP | 8197281 | * 8/1996 | .............. B23K 35/30 |
| JP | 11-57848 A | 3/1999 | |
| JP | 2002-150633 A | 5/2002 | |
| JP | 2004-039477 | * 2/2004 | .............. C22C 21/00 |
| JP | 2004-139832 A | 5/2004 | |
| JP | 2005-108654 A | 4/2005 | |
| JP | 2006-190575 | * 7/2006 | .............. H01B 13/00 |
| JP | 2008-262808 | * 10/2008 | .............. H01B 7/00 |
| JP | 2008-262808 A | 10/2008 | |
| JP | 2009-129550 A | 6/2009 | |
| JP | 2010-36237 A | 2/2012 | |
| WO | 2006/046358 A1 | 5/2006 | |

OTHER PUBLICATIONS

Office Action issued by Korean Patent Office in Korean Application No. 10-2012-7027195 mailed Jul. 18, 2014.
Office Action issued by Chinese Patent Office in Chinese Application No. 201180015433.9 mailed Feb. 12, 2014.
Ma Yong-qing, et al., "Bonding mechanism, microstructure and properties of the bimetallic wires by clad-drawing", Functional Material, 2009, vol. 40, p. 94-97.
Office Action issued by the Japanese Patent Office in Japanese Application No. 2010-549365 dated Feb. 5, 2013.
Fujikura News No. 340, Nov. 11, 2009, pp. 1-2 with (English translation).

* cited by examiner

FIG. 12

| STRUCTURE | | PRESENT INVENTION (DIES) | COMPARATIVE EXAMPLE (ANNEAL) |
|---|---|---|---|
| | COPPER ALUMINUM | WORKED STRUCTURE<br><br>FIBER-LIKE STRUCTURE IN LONGITUDINAL DIRECTION | RECRYSTALLIZED STRUCTURE<br><br>LARGE CRYSTAL GRAIN SIZE |
| VOLUME RESISTIVITY ($\mu\Omega$cm) | COPPER | 1.770 | 1.724 |
| | ALUMINUM | 2.826 | 2.826 |
| CONDUCTIVITY (%IACS) | COPPER | 97 | 100 |
| | ALUMINUM | 61 | 61 |
| VICKERS HARDNESS (Hv) | COPPER | 120 | 60 |
| | ALUMINUM | 45 | 25 |

FIG. 20
(a)
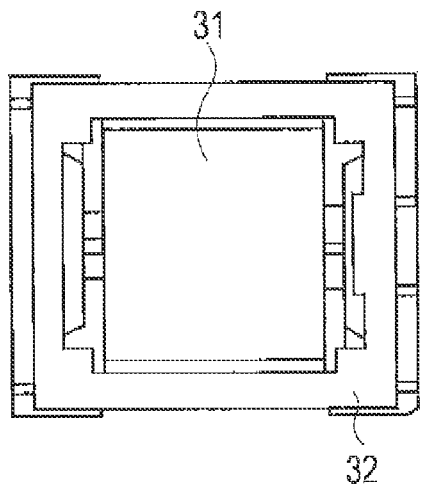
(b)
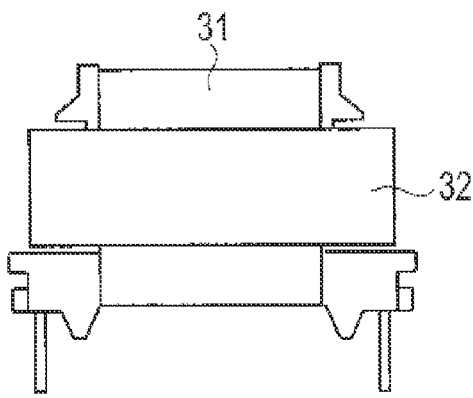
(c)
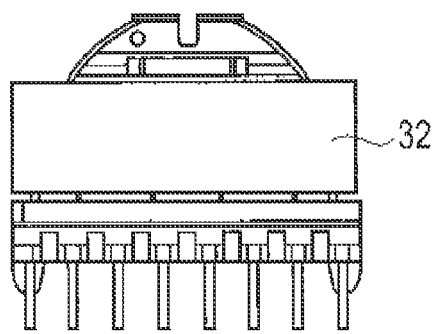

FIG. 21

| WINDING WIRE | INDUCTANCE (μH) | | | DIRECT-CURRENT RESISTANCE(Ω) | ALTERNATING-CURRENT RESISTANCE(Ω) | | |
|---|---|---|---|---|---|---|---|
| | 1kHz | 20kHz | 40kHz | | 10kHz | 20kHz | 40kHz |
| COPPER WINDING WIRE (COMPARATIVE EXAMPLE) | 976 | 973 | 971 | 0.069 | 0.550 | 1.843 | 5.956 |
| ALUMINUM WINDING WIRE (COMPARATIVE EXAMPLE) | 971 | 971 | 973 | 0.112 | 0.328 | 0.917 | 3.057 |
| 5% CCA WINDING WIRE (PRESENT INVENTION) | 973 | 974 | 976 | 0.109 | 0.316 | 0.904 | 3.139 |

FIG. 23

| TEMPERATURE(°C) | 22.3 | 20.6 | 20.7 | 20.8 | 21.5 | 21.0 |
|---|---|---|---|---|---|---|
| MEASURING CONDITIONS | ALUMINUM WINDING WIRE (COMPARATIVE EXAMPLE) | 5% CCA WINDING WIRE (PRESENT INVENTION) | 10% CCA WINDING WIRE (PRESENT INVENTION) | 15% CCA WINDING WIRE (PRESENT INVENTION) | COPPER WINDING WIRE (COMPARATIVE EXAMPLE) | ALLOYED ALUMINUM 5% CCA WINDING WIRE (PRESENT INVENTION) |
| 7mA FIXED MEASURING FREQUENCY F(kHz) | Rs(Ω) ALUMINUM WINDING WIRE | Rs(Ω) 5% CCA WINDING WIRE | Rs(Ω) 10% CCA WINDING WIRE | Rs(Ω) 15% CCA WINDING WIRE | Rs(Ω) COPPER WINDING WIRE | Rs(Ω) ALLOYED ALUMINUM 5% CCA WINDING WIRE |
| 0.1 | 0.112 | 0.109 | 0.106 | 0.103 | 0.069 | 0.122 |
| 0.5 | 0.113 | 0.110 | 0.107 | 0.105 | 0.074 | 0.123 |
| 1 | 0.114 | 0.112 | 0.110 | 0.107 | 0.075 | 0.123 |
| 3 | 0.133 | 0.129 | 0.132 | 0.138 | 0.115 | 0.136 |
| 5 | 0.169 | 0.163 | 0.180 | 0.104 | 0.194 | 0.167 |
| 7 | 0.221 | 0.223 | 0.252 | 0.275 | 0.310 | 0.209 |
| 10 | 0.328 | 0.316 | 0.400 | 0.445 | 0.550 | 0.297 |
| 15 | 0.579 | 0.563 | 0.751 | 0.848 | 1.110 | 0.512 |
| 20 | 0.917 | 0.904 | 1.225 | 1.391 | 1.843 | 0.816 |
| 25 | 1.320 | 1.328 | 1.806 | 2.050 | 2.712 | 1.199 |
| 30 | 1.825 | 1.943 | 2.492 | 2.818 | 3.700 | 1.662 |
| 35 | 2.401 | 2.446 | 3.275 | 3.685 | 4.786 | 2.203 |
| 40 | 3.057 | 3.139 | 4.150 | 4.640 | 5.956 | 2.835 |
| 45 | 3.860 | 3.982 | 5.161 | 5.745 | 7.290 | 3.014 |
| 50 | 4.720 | 4.885 | 6.270 | 6.900 | 8.578 | 4.446 |
| 60 | 6.470 | 6.726 | 8.488 | 9.227 | 11.490 | 6.112 |
| 70 | 8.650 | 9.016 | 11.140 | 11.940 | 16.100 | 8.220 |
| 80 | 11.160 | 11.640 | 14.070 | 14.910 | 18.270 | 10.650 |
| 100 | 17.130 | 17.820 | 20.860 | 21.650 | 26.280 | 16.470 |
| Rdc at 5V | 0.112 | 0.109 | 0.106 | 0.103 | 0.069 | 0.121 |

HIGH FREQUENCY CABLE, HIGH FREQUENCY COIL AND METHOD FOR MANUFACTURING HIGH FREQUENCY CABLE

CROSS-REFERENCE TO RELATED APPLICATIONS

The application is a Continuation of PCT Application No. PCT/JP2011/056984, filed on Mar. 23, 2011, and claims the benefit of priority from the prior Japanese Patent Application No. 2010-066793, filed on Mar. 23, 2010, the entire contents of which are incorporated herein by reference.

BACKGROUND

The present invention relates to a high frequency cable and a high frequency coil, and particularly to a high frequency cable used as a winding wire, a litz wire, a cable and the like for various high frequency devices, and to a high frequency coil.

In winding wires and feed cables of devices (such as a transformer, a motor, a reactor, induction heating equipment, a magnetic head assembly) in which a high frequency current flows, eddy-current losses are caused in conductors due to magnetic fields generated by the high frequency currents, and, as a result, alternating-current resistance is increased (skin effect and proximity effect are enhanced), thus causing heat generation and an increase in power consumption. As a general measure to suppress enhancement of skin effect and proximity effect, a reduction of wire diameter and use of litz wire in which each wire has insulating coating are adapted (for example, refer to Japanese Unexamined Patent Application Publication No 2009-129550 (hereinafter referred to as "Patent Literature 1"), Japanese Unexamined Patent Application Publication No. Showa 62-76216 (hereinafter referred to as "Patent Literature 2"), Japanese Unexamined Patent Application Publication No. 2005-108654 (hereinafter referred to as "Patent Literature 3"), International Publication No. WO2006/046358 (hereinafter referred to as "Patent Literature 4") and Japanese Unexamined Patent Application Publication No. 2002-150633 (hereinafter referred to as "Patent Literature 5")).

However, with the means of the prior art, it is difficult to remove the insulating thin layer during a soldering process for the conductor connection, and there is a limit to wire diameter reduction because the number of wires increases. In addition, no effective measures have been found to suppress proximity effect for wires having diameters with which proximity effect is overwhelmingly predominant compared to skin effect, and it is commonly known that characteristics obtained by the diameter reduction measure have limitation. Although examples of countermeasures are presented in Patent Literatures 1 to 5, all of those countermeasures are ideas only and short on specifics, and cannot be regarded as effective countermeasures.

Moreover, in Patent Literature 2, a plurality of composite conductors made from a central conductor and an outer conductor are twisted together and recrystallized through a thermal treatment to manufacture a high frequency cable. However, with this cable, it is difficult to sufficiently suppress proximity effect, and damage and deformation occur easily during manufacturing processes, so it has been difficult to sufficiently stabilize the characteristics of the cable as a coil.

SUMMARY

In view of the aforementioned problems, an object of the present invention is to provide a high frequency cable and a high frequency coil which can suppress alternating-current resistance and can suppress heat generation and power consumption.

According to an aspect of the present invention, a high frequency cable is provided, which is provided with a central conductor made from aluminum or an aluminum alloy, a covering layer which is made from copper that covers the central conductor and has a fiber-like structure in a longitudinal direction, and an intermetallic compound layer which is formed between the central conductor and the covering layer and has greater volume resistivity than the covering layer, and a cross-sectional area of the covering layer is 15% or less of an entire cross-sectional area which includes the central conductor, the intermetallic compound layer, and the covering layer.

According to another aspect of the present invention, a high frequency coil in which a high frequency cable is used is provided, where the high frequency cable is provided with a central conductor made from aluminum or an aluminum alloy, a covering layer which is made from copper that covers the central conductor and has a fiber-like structure in a longitudinal direction, and an intermetallic compound layer which is formed between the central conductor and the covering layer and has greater volume resistivity than the covering layer, and a cross-sectional area of the covering layer is 15% or less of an entire cross-sectional area which includes the central conductor, the intermetallic compound layer, and the covering layer.

BRIEF DESCRIPTION OF DRAWINGS

FIG. 12 is a table showing structures and properties (actual measured vales) of a high frequency cable according to the embodiment of the present invention and a high frequency cable according to the comparative example.

FIG. 20(a) is a top view of a reactor according to Example 2 of the present invention, FIG. 20(b) is a side view of the reactor according to Example 2 of the present invention, and FIG. 20(c) is another side view of the reactor according to Example 2 of the present invention.

FIG. 21 is a table showing properties (actual measured values) of the reactor according to Example 2 of the present invention.

FIG. 23 is a table showing properties (actual measured values) of the reactor according to Example 3 of the present invention.

DETAILED DESCRIPTION OF THE EMBODIMENT

Figure 1:
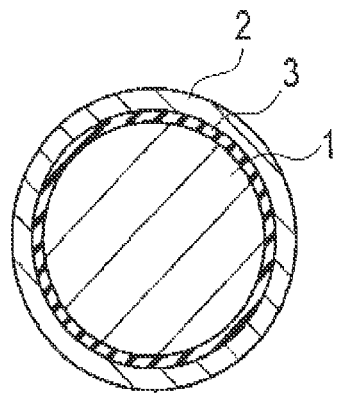
FIG. 1 is a cross-sectional view showing an example of a high frequency cable according to an embodiment of the present invention.

Next, an embodiment of the present invention will be explained with reference to the drawings. In the following descriptions of the drawings, same or similar parts are denoted by same or similar reference numerals. However, it should be noted that the drawings are schematic views, and relations between thicknesses and plan surface measurements, a thickness ratio of each layer and so on are different from reality. Therefore, specific thicknesses and measurements need to be determined in consideration of the following explanations. Also, needless to say, some measurement relationships and ratios are different among the drawings.

Also, the embodiment described below is to show examples of devices and methods for embodying technical thinking of the present invention, and the technical thinking of this invention does not limit materials, shapes, structures, arrangements and so on of components to those described below. Various changes may be made in the technical thinking of the present invention within the scope of the claims of the patent.

(Structure of High Frequency Cable)

As illustrated in FIG. 1, a high frequency cable according to an embodiment of the present invention includes a central conductor 1 made from aluminum (Al) or an aluminum alloy, a covering layer 2 made from copper (Cu) which covers the central conductor 1, and an intermetallic compound layer (an alloy layer) 3 which is formed between the central conductor 1 and the covering layer 2 such that the composition thereof changes obliquely from the central conductor 1 through the covering layer 2, and has greater volume resistivity than the covering layer 2.

The cross-sectional area of the covering layer 2 is 15% or less of the cross-sectional area of the entire high frequency cable, which includes the central conductor 1, the intermetallic compound layer 3, and the covering layer 2. The cross-sectional area of the covering layer 2 is preferably between approximately 3% and 15% of the entire cross-sectional area, more preferably between approximately 3% and 10% of the same, and even more preferably between approximately 3% and 5% of the same. The smaller the ratio of the cross-sectional area of the covering layer 2 becomes to the entire high frequency cable, the more high-frequency resistance can be reduced. It is preferred that the diameter of the entire high frequency cable be approximately between 0.05 mm and 0.6 mm.

For the central conductor 1, for example, aluminum for electrical purposes (EC aluminum) or an aluminum alloy of Al—Mg—Si alloy (JIS 6000-series alloy) may be adapted, but an aluminum alloy is preferred rather than EC aluminum because an aluminum alloy has greater volume resistivity.

The intermetallic compound layer 3 is generated in a wire drawing process for a high frequency cable by performing wire drawing of the central conductor 1 which is covered by the covering layer 2, using dies each having a cross-section reduction rate of 20% or higher and combined into multiple stages. The thickness of the intermetallic compound layer 3 is between approximately 10 nm and 1 μm. The intermetallic compound layer 3 contains, for example, $Cu_9Al_4$, $CuAl_2$, and so on. The volume resistivity of the intermetallic compound layer 3 is, for example, between approximately 10 μΩcm and 40 μΩcm, which is greater than the volume resistivity of the covering layer 2.

Figure 2:
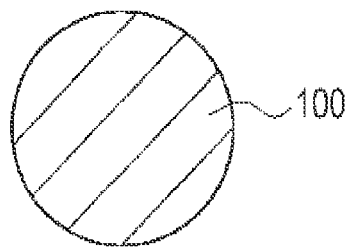
FIG. 2 is a cross-sectional view showing a copper wire according to a comparative example.
Figure 3:
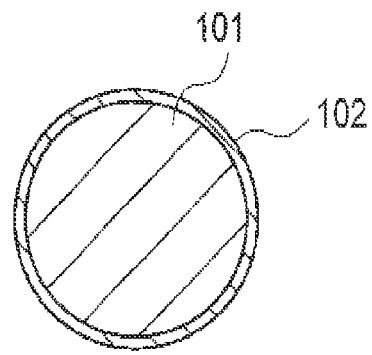
FIG. 3 is a cross-sectional view showing a copper-clad aluminum wire according to the comparative example.

Typically, as a winding wire of a transformer, a reactor or the like, a copper wire 100 as illustrated in FIG. 2 which is covered by an insulating coating of polyurethane, polyester, polyester imide, polyamide imide, polyimide, or the like is used. In a case of a coaxial cable, characteristics of skin effect are taken into consideration because of a high frequency current signal, and a copper-clad aluminum wire (hereinafter, referred to as a "CCA wire") as illustrated in FIG. 3 is used in which an aluminum wire 101 has a thin copper layer 102 covering outside thereof.

In recent years, devices to which a high frequency current of approximately several kHz to several hundreds kHz is applied, such as a high frequency transformer, a high speed motor, a reactor, induction heating equipment, a magnetic head assembly, a non-contact power supply system and the like are increasingly used, and, as high frequency cables used in such devices, winding wires having reduced diameters or Litz wires are generally used for the purpose of reducing alternating-current losses. However, it is difficult to remove an insulating thin layer during a soldering process for the conductor connection, and there is a limit on diameter reduction since the number of wires is increased. On the contrary, the high frequency cable according to the embodiment of the present invention further enhances a deterrent effect of a wire with reduced diameter to prevent an increase of alternating-current resistance without using litz wire.

Figure 4:
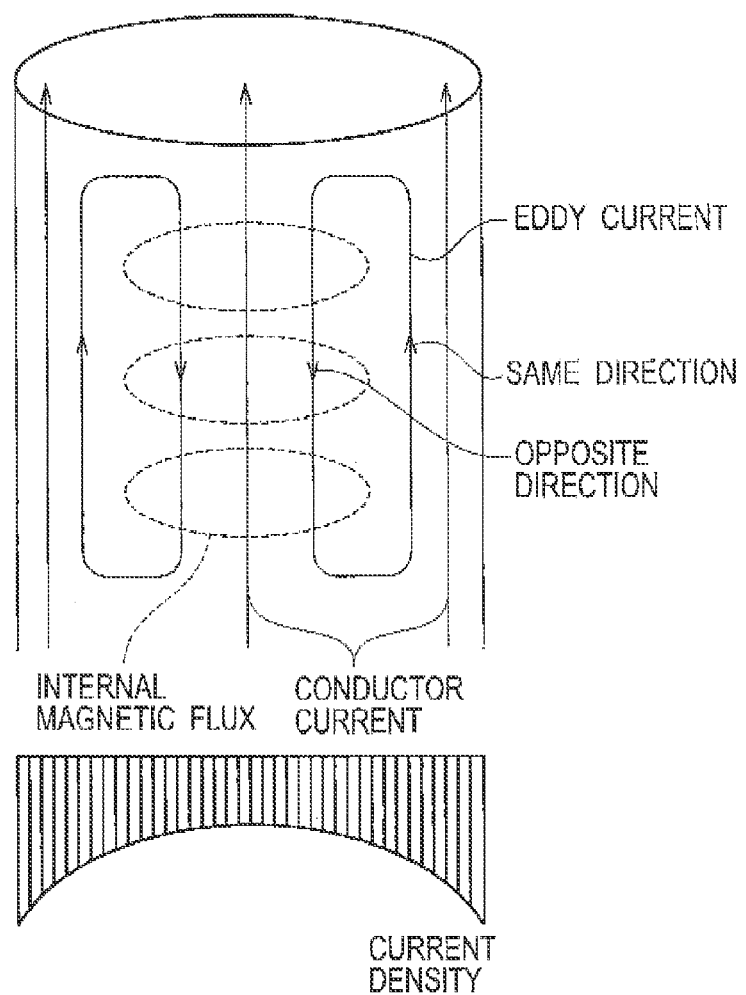
FIG. 4 is a schematic view for explaining skin effect according to the embodiment of the present invention.
Figure 5:
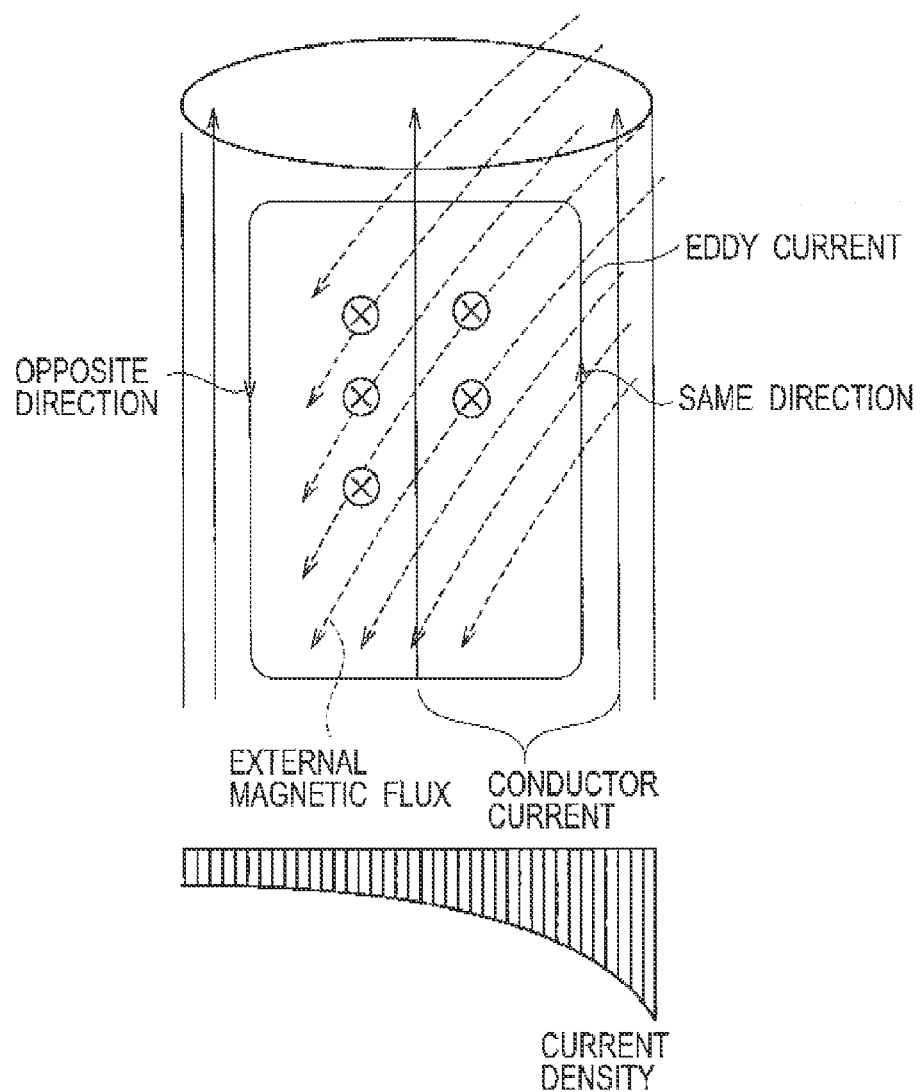
FIG. 5 is a schematic view for explaining proximity effect according to the embodiment of the present invention.

As illustrated in FIG. 4, eddy currents flow within a conductor due to internal magnetic fluxes, which increases alternating-current resistance as skin effect. Also, as shown in FIG. 5, an eddy current flows within the conductor due to external magnetic fluxes, which increases alternating-current resistance as proximity effect.

Figure 6:
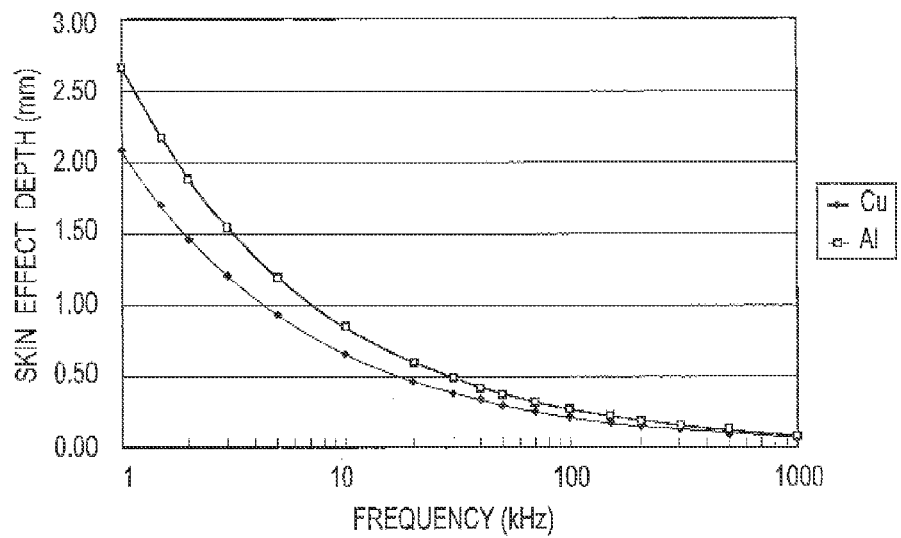
FIG. 6 is a graph showing a relationship between skin effect depth and frequency (theoretical values in a single wire model of a single cable) according to the embodiment of the present invention.

FIG. 6 shows a relationship between frequency and skin effect depth (or skin depth) in a single wire model of a single cable. The skin effect depth represents a depth from a surface of a cable, at which a current density is 1/e (approximately 0.37) of the surface. As evident from FIG. 6, it is understood that an impact of skin effect is small in a case where a wire diameter is 0.5 mm (equivalent of twice the skin effect depth of about 0.25 mm) when a frequency range is approximately 100 kHz or lower.

Figure 7:
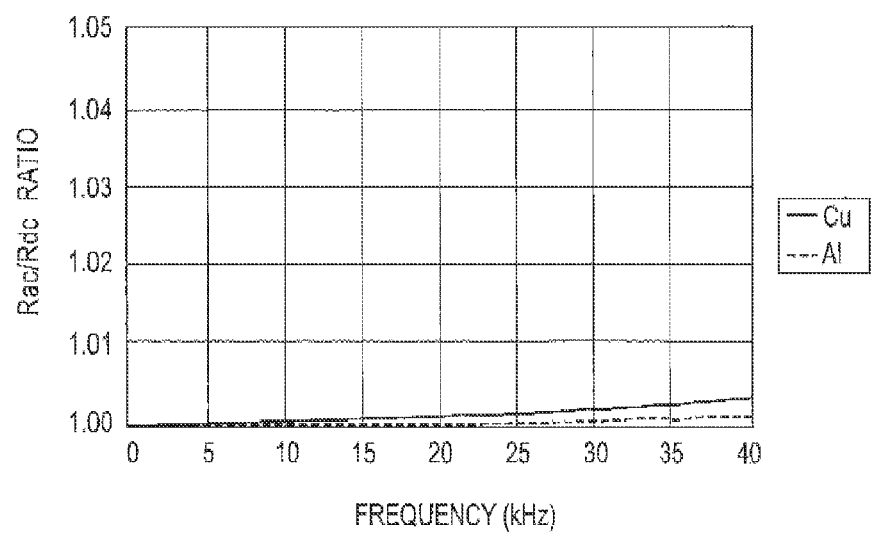
FIG. 7 is a graph showing a relationship between skin effect and frequency (theoretical values in a single wire model of a single cable) with regard to a copper wire and an aluminum wire according to the embodiment of the present invention.
Figure 8:
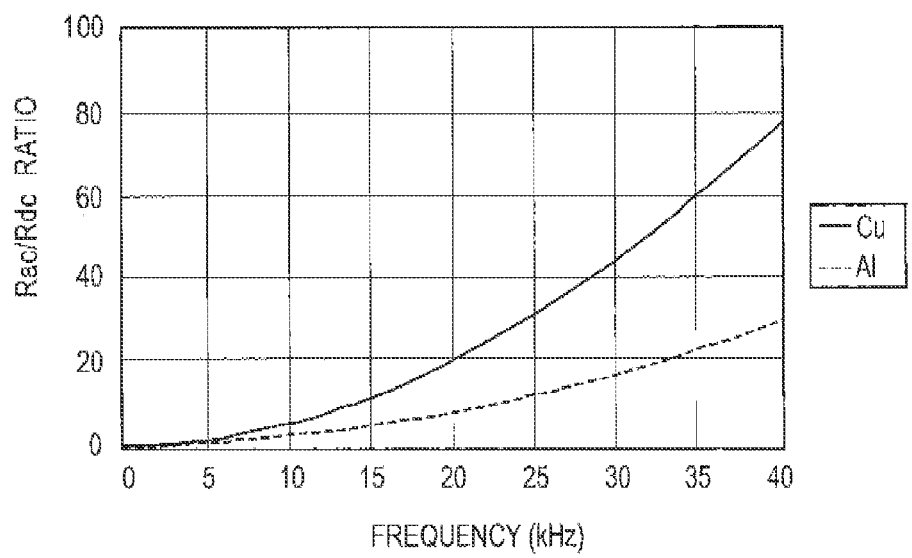
FIG. 8 is a graph showing a relationship between proximity effect and frequency (theoretical values in a single wire model of a single cable) with regard to the copper wire and the aluminum wire according to the embodiment of the present invention.

FIGS. 7 and 8 respectively show frequency characteristics of alternating-current resistance under skin effect and proximity effect as a ratio between alternating-current resistance (Rac) and direct-current resistance (Rdc) (Rac/Rdc), on a single wire model of a single cable having a diameter of 0.4 mm. In FIG. 8, an external magnetic field H is set to 37.8 A/mm. In a case of FIG. 7 where skin effect is present, an increase tendency of Rac/Rdc is smaller than the case of FIG. 8 where proximity effect is present. On the other hand, in the case of FIG. 8 where proximity effect is present, Rac/Rdc increases significantly as frequency goes higher. This tendency of increase depends on a magnetic field strength. In other words, proximity effect is a predominant cause of alternating-current losses in a thin winding wire due to high frequency currents. Further, it is found from these theoretical calculation results that characteristics of proximity effect are smaller in an aluminum wire than in a copper wire. As a measure against proximity effect, it was proved that increasing volume resistivity of a conductor is an effective method, in addition to reducing a wire diameter of a conductor to the extent possible. However, there is a limit to an increase of volume resistivity, so it is preferred that a conductor material be selected from generally-used materials. Between copper and aluminum which are general-purpose conductor materials, aluminum whose conductivity is 61% of copper has better characteristics in reducing proximity effect. Meanwhile, in a case of aluminum, a surface thereof is covered with an oxide film, and it is extremely difficult to remove the oxide film especially from a thin wire which is used as a measure against proximity effect. Therefore, we focused on a CCA wire, in which an aluminum wire is covered by thin copper on the outer side thereof.

On the other hand, in a case of a CCA wire, since the volume resistivity of copper is smaller than aluminum, eddy currents generated by an external magnetic field are gathered on the copper side and easily carried in a longitudinal direction of the wire, which means the properties of aluminum, which has smaller proximity effect than copper, are lost even if aluminum is applied as a central conductor.

Figure 9:
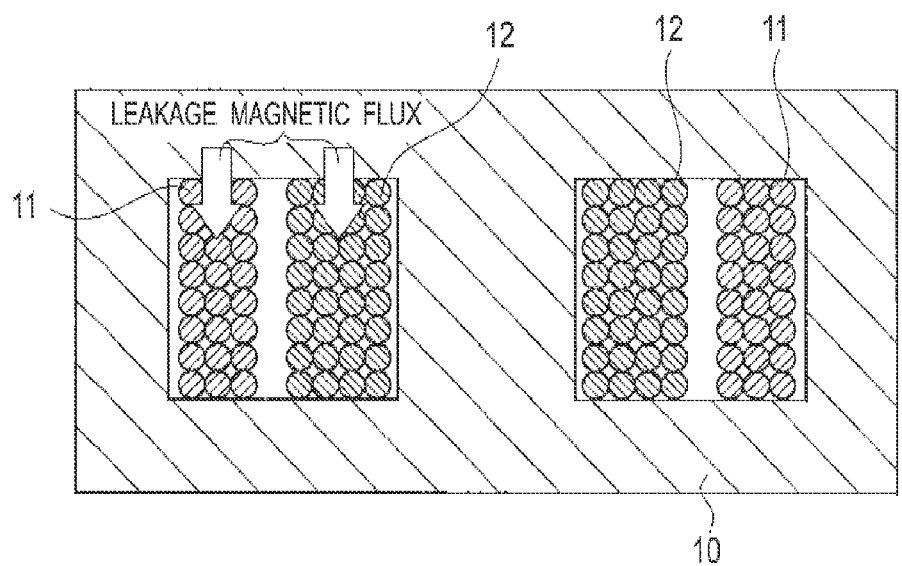
FIG. 9 is a schematic view of magnetic fluxes and leakage fluxes due to currents in a magnetic core of a transformer model, in which an assembled conductor according to the embodiment of the present invention is winded around an iron core.

A high frequency transformer model is shown in FIG. 9 as an actual example of high frequency power devices. The high frequency transformer model includes a magnetic core 10 and first winding wires 11 and second winding wires 12 which are winded around the magnetic core 10. In addition to magnetic fluxes due to currents flowing in the neighboring first and second winding wires 11 and 12, leakage magnetic fluxes from the magnetic core 10 also flow in the first and second winding wires 11 and 12, so eddy current losses occur due to such external magnetic fluxes. Therefore, in the high frequency transformer model, an increase in alternating-current resistance is greater than the single wire model of a single cable.

Figure 10:
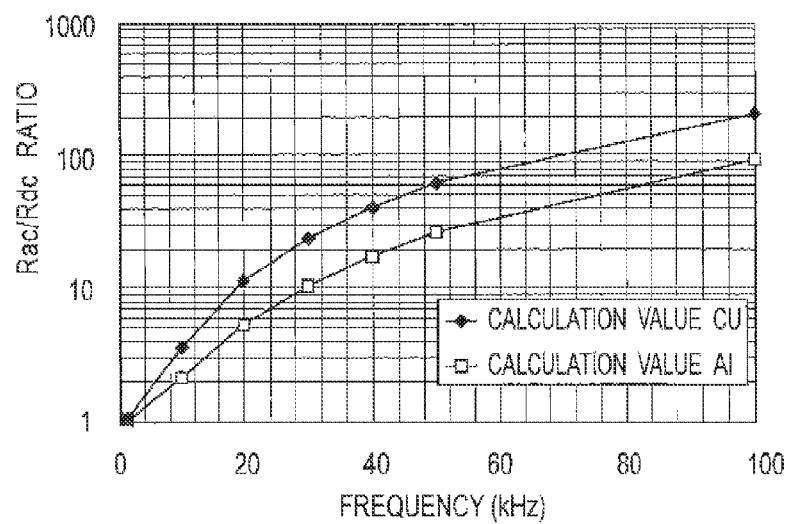
FIG. 10 is a graph showing properties (theoretical values) of an example of a high frequency transformer according to the embodiment of the present invention.
Figure 11:
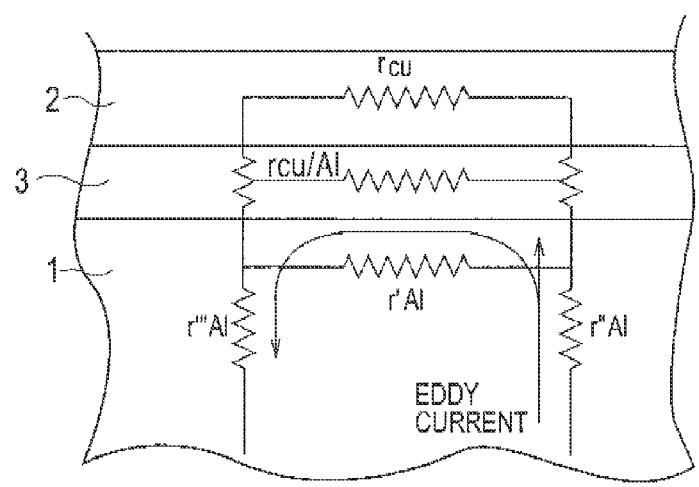
FIG. 11 illustrates a segment model of an eddy current and an equivalent circuit thereof according to the embodiment of the present invention.

FIG. 10 shows theoretical calculation values of frequency characteristics of alternating-current resistance as Rac/Rdc with regard to the high frequency transformer model illustrated in FIG. 9. It is also evident in the case of this actual model that alternating-current resistance is significantly reduced in an aluminum wire compared to a copper wire. The above-mentioned superiority of an aluminum wire attributes to the fact that aluminum has greater volume resistivity than copper. On the contrary, aluminum has a difficulty in soldering. Hence, a CCA wire may be considered appropriate as it can cover the shortcoming of the aluminum in practice, but, since a copper layer is provided on the outer side, eddy currents flow in the copper layer, which ends up deteriorating properties of the aluminum wire.

On the other hand, as illustrated in FIG. 1, according to the high frequency cable of the embodiment of the present invention, eddy currents flowing from the central conductor 1 toward the covering layer 2 can be suppressed by the intermetallic compound layer 3 which has higher volume resistivity than the covering layer 2 as illustrated in FIG. 1, thus inhibiting skin effect and proximity effect. Also, since the intermetallic compound layer 3 is generated in the interface between the central conductor 1 and the covering layer 2, a thickness of the covering layer 2 in the wire diameter is equivalently reduced, thus reducing proximity effect. Therefore, alternating-current resistance can be suppressed without using a twisted wire (litz wire), and heat generation and power consumption can be inhibited.

Figure 13:
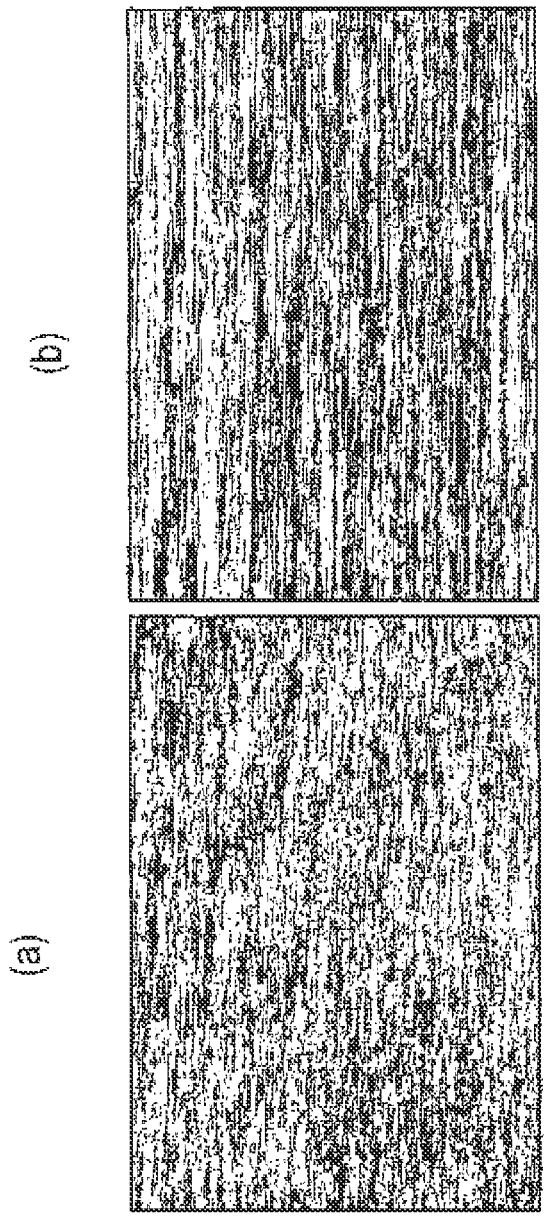
FIG. 13(a) is a photograph from an optical microscope showing a cross section of a worked structure of tough pitch copper (TPC) manufactured using an SCR method.
FIG. 13(b) is a photograph from an optical microscope showing a cross section of a worked structure of a copper wire manufactured using a dip forming method.

Next, the high frequency cable according to the embodiment of the present invention will be explained in contract to a high frequency cable described as a comparative example which is recrystallized through a thermal treatment at a recrystallizing temperature or higher. Since the high frequency cable according to the embodiment of the present invention is generated by wire drawing of the central conductor 1 covered by the covering layer 2 using dies combined in multiple steps, the central conductor 1 and the covering layer 2 become worked structures and have fiber-like structures in a longitudinal direction as schematically depicted in FIG. 12. Here, a worked structure means a cold-worked structure. Cold working means processing conducted at a recrystallizing temperature or lower. Further, a fiber-like structure means a structure in which crystal grains are stretched in a drawing direction by a wire-drawing process. As examples of such worked structures, FIG. 13(a) shows a cross section of a worked structure of tough pitch copper (TPC) having a diameter of 0.9 mm which is manufactured by using a SCR (Southwire continuous rod) method, and FIG. 13(b) shows a cross section of a worked structure of an oxygen-free copper (OFC) having a diameter of 0.9 mm which is manufactured by a dip forming method.

Figure 14:
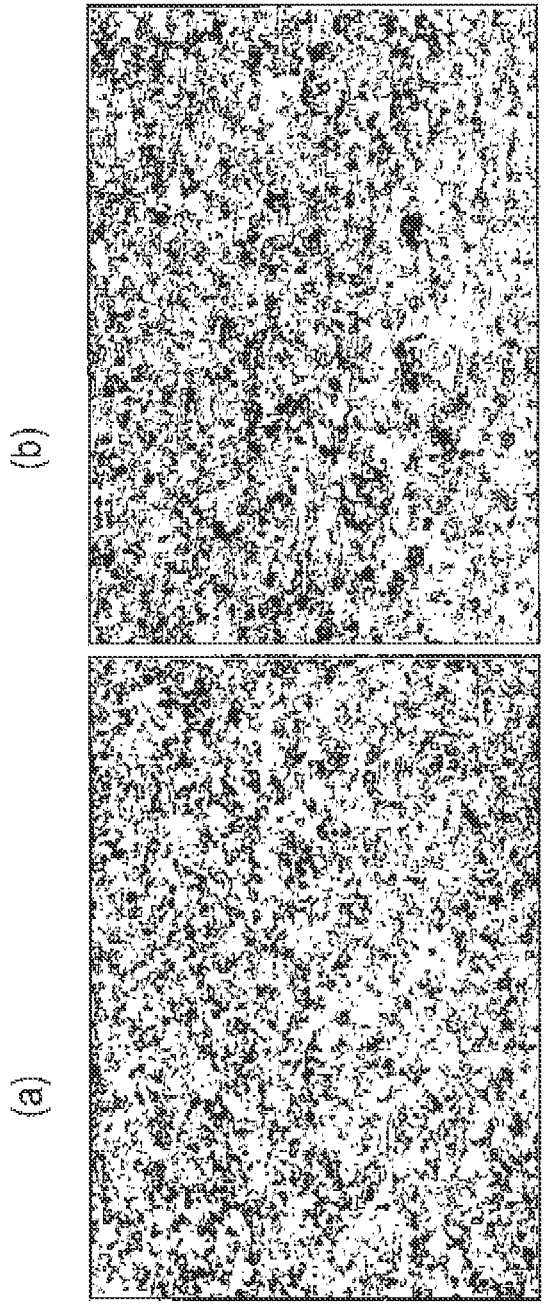
FIG. 14(a) is a photograph from an optical microscope showing a cross section of a recrystallized structure of tough pitch copper (TPC) manufactured using the SCR method.
FIG. 14(b) is a photograph from an optical microscope showing a cross section of a recrystallized structure of a copper wire manufactured using the dip forming method.

Meanwhile, as schematically illustrated in FIG. 12, the high frequency cable according to the comparative example has a recrystallized structure which has been recrystallized by conducting a thermal treatment at a recrystallizing temperature or higher. Here, the recrystallized structure means a structure in which crystal grains having strains caused by cold working are replaced by crystals having no strain through recrystallization. As examples of recrystallized structures, FIG. 14(a) shows a cross section of a recrystallized structure of tough pitch copper (TPC) having a diameter of 0.9 mm which is manufactured by the SCR method, and FIG. 14(b) shows across section of a recrystallized structure of oxygen-free copper (OFC) having a diameter of 0.9 mm which is manufactured by the dip farming method.

Also, as shown in FIG. 12, the high frequency cable according to the embodiment of the present invention is able to suppress proximity effect better since a volume resistivity value thereof is higher than the high frequency cable according to the comparative example. Moreover, the high frequency cable according to the embodiment of the present invention has higher Vickers hardness than the high frequency cable according to the comparative example, and thus has higher resistance to damages and deformation at the time of manufacturing, which results in mare stable properties thereof as a coil.

(Method for Manufacturing a High Frequency Cable)

Next, a method for manufacturing the high frequency cable according to the embodiment of the present invention will be explained. The manufacturing method described below is only an example, and a manufacturing method is not particularly limited thereto. The high frequency cable according to the embodiment of the present invention may be manufactured in various manufacturing methods.

(a) The central conductor 1 is prepared, which is made from aluminum or an aluminum alloy and has a diameter between approximately 9.5 mm and 12.0 mm. The surface of the central conductor 1 is covered with the covering layer 2 by conducting TIG welding or plasma welding of a copper tape having a thickness of between approximately 0.1 mm and 0.4 mm while longitudinally applying the copper tape to the surface of the central conductor 1. Next, the central conductor 1 covered by the covering layer 2 is formed to have a diameter of between 9.3 mm and 12.3 mm by skin pass, thus fabricating a base material constituted by the central conductor 1 covered by the covering layer 2.

Figure 15:
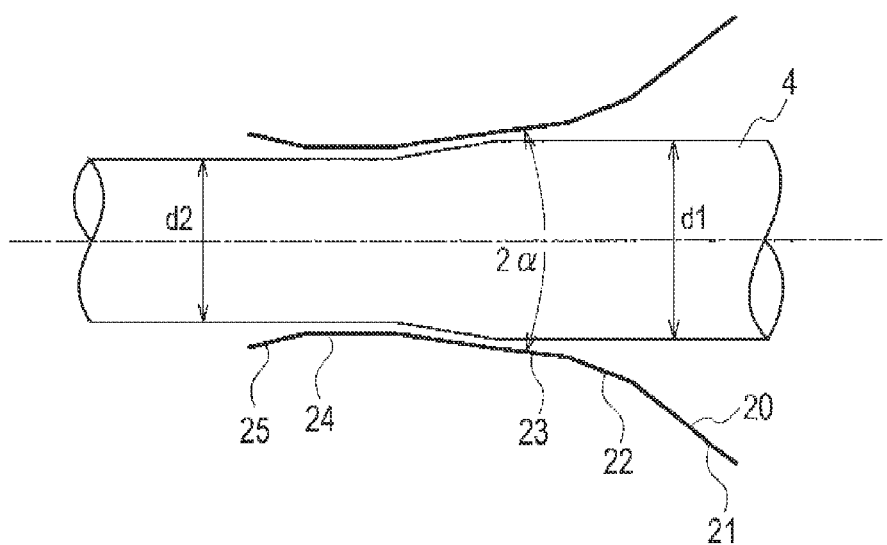
FIG. 15 is a schematic view showing an example of wire drawing dies according to the embodiment of the present invention.
Figure 16:
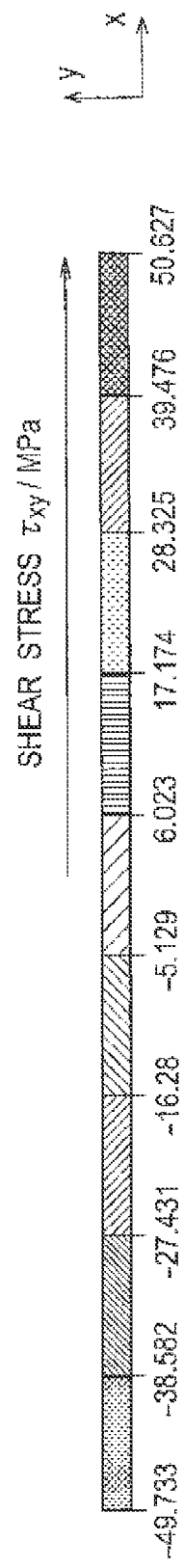
FIG. 16 is a schematic view showing classification of shear stress during wire drawing.
Figure 17:
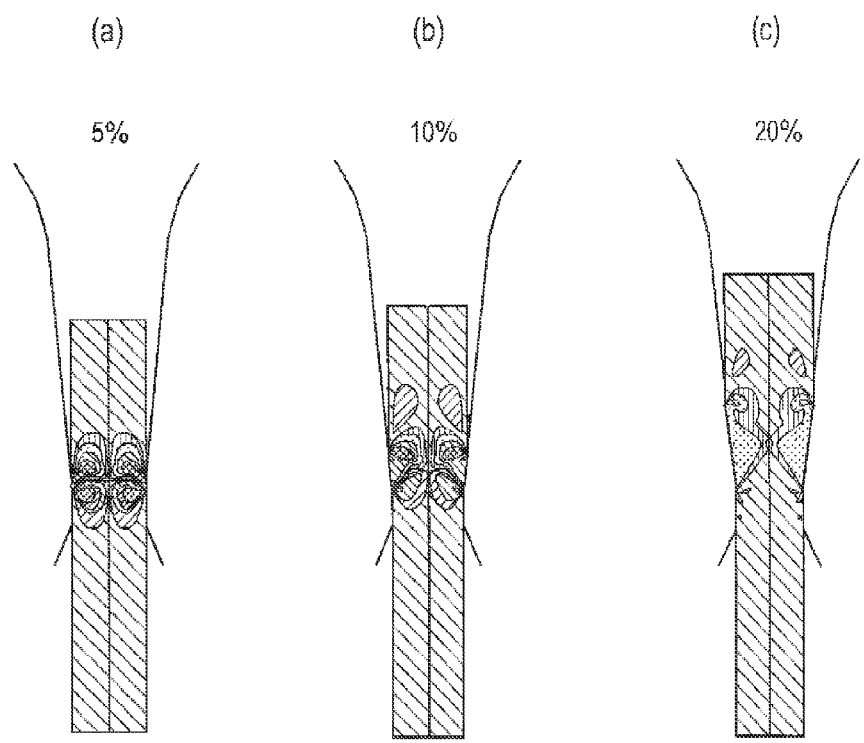
FIG. 17(a) is a schematic view (No. 1) showing an analysis of stress distribution during wire drawing according to the embodiment of the present invention.
FIG. 17(b) is a schematic view (No. 2) showing an analysis of stress distribution during wire drawing according to the embodiment of the present invention.
FIG. 17C is a schematic view (No. 3) showing an analysis of stress distribution during wire drawing according to the embodiment of the present invention.

(b) Next, the base material is drawn by being passed through wire drawing dies at multiple stages. As illustrated in FIG. 15, the wire drawing dies 20 include an entrance section 21, an approach section 22, a reduction section 23, a bearing section 24, and a back relief section 25. The base material 4 is worked at the reduction section 23 to have a diameter d2 which is smaller than a diameter d1 before wire drawing. In the embodiment of the present invention, in each of the wire drawing dies, a reduction angle α shown in FIG. 15 is approximately 8 degrees (the entire angle of 2α=16 degrees), and a cross-section reduction rate is approximately 20% or higher per pass (wire drawing die), preferably between approximately 20% and 29%. By setting the cross-section reduction rate of the wire drawing dies to around 20% or higher, or preferably between about 20% and 29%, large shear stresses can be generated continually in the same direction. Due to this shearing heat generation, the intermetallic compound layer 3 made from the materials of the central conductor 1 and the covering layer 2 is formed in the interface between the central conductor 1 and the covering layer 2. Because the base material passes through the wire drawing dies at multiple stages, the final diameter of the high frequency cable becomes approximately 0.6 mm or less.

With the manufacturing method of the high frequency cable according to the embodiment of the present invention, the intermetallic compound layer 3 is formed between the central conductor 1 and the covering layer 2 without performing a thermal treatment after wire drawing as the cross-section reduction rates of the dies combined in multiple stages in the wire drawing process are set to 20% or higher, thus making it possible to manufacture the high frequency cable illustrated in FIG. 1.

FIGS. 16 and 17(a) to 17(c) show finite element method (FEM) analysis of stress distributions in longitudinal sections when wire drawing is conducted. Following the shear stress classification shown in FIG. 16, FIGS. 17(a) to 17(c) show stress distributions in longitudinal sections during wire drawing when the cross-section reduction rates of the wire drawing dies are 5%, 10%, and 20%. From FIGS. 17(a) to 17(c), it is proved that a large shear stress is generated when the cross-section reduction rate of the wire drawing dies is 20%, compared to the cases where the cross-section reduction rates of the wire drawing dies are 5% and 10%. In the embodiment of the present invention, wire drawing is conducted gradually by using a plurality of wire drawing dies having a cross-section reduction rate of 20% or higher so as to produce greater shear heating continuously and periodically. Therefore, the intermetallic compound layer 3 can be generated in an excellent bonding state so that the structure thereof changes obliquely between the central conductor 1 and the covering layer 2.

Example 1

As Example 1, an intermetallic compound layer 3 was formed between a central conductor 1 and a covering layer 2 as illustrated in FIG. 1 by using a plurality of wire drawing dies each having a cross-section reduction rate of 20% or higher, and a high frequency cable was fabricated in which the cross-sectional area of the covering layer 2 was 5% of the cross-sectional area of the entire high frequency cable (hereinafter, referred to as a "5% CCA wire"). First, a base material was fabricated by welding a 0.15 mm-thick copper tape by TIG welding onto the central conductor 1 made from aluminum with a diameter of 9.5 mm, while applying the copper tape longitudinally thereto, and the base material was then formed to have a diameter of 9.25 mm by skin pass. This base material was then passed through wire drawing dies at multiple stages (26 passes) to reduce the diameter from 9.25 mm to 0.4 mm. The reduction angle α of each of the wire drawing dies was set to 8 degrees flat (the entire angle of 2α=16 degrees), the crass-section reduction rates from the first pass through the third pass were set to between 29% and 24%, the cross-section reduction rates from the fourth pass through the tenth pass were set to between 23% and 21%, and the cross-section reduction rates from the eleventh pass through the twenty-sixth pass were set to between 21% and 20%.

The copper/aluminum interface of the 5% CCA wire according to Example 1 of the present invention was observed using a transmission electron microscope (TEM). From the TEM observation, it was confirmed that an intermetallic compound having a thickness of 10 nm or larger was generated in a good bonding condition when the diameter was 1.6 mm after the fourteenth pass. Similarly, an intermetallic compound having a thickness of 10 nm or larger was confirmed when the diameter was 0.4 mm after the twenty-sixth pass.

Figure 18:
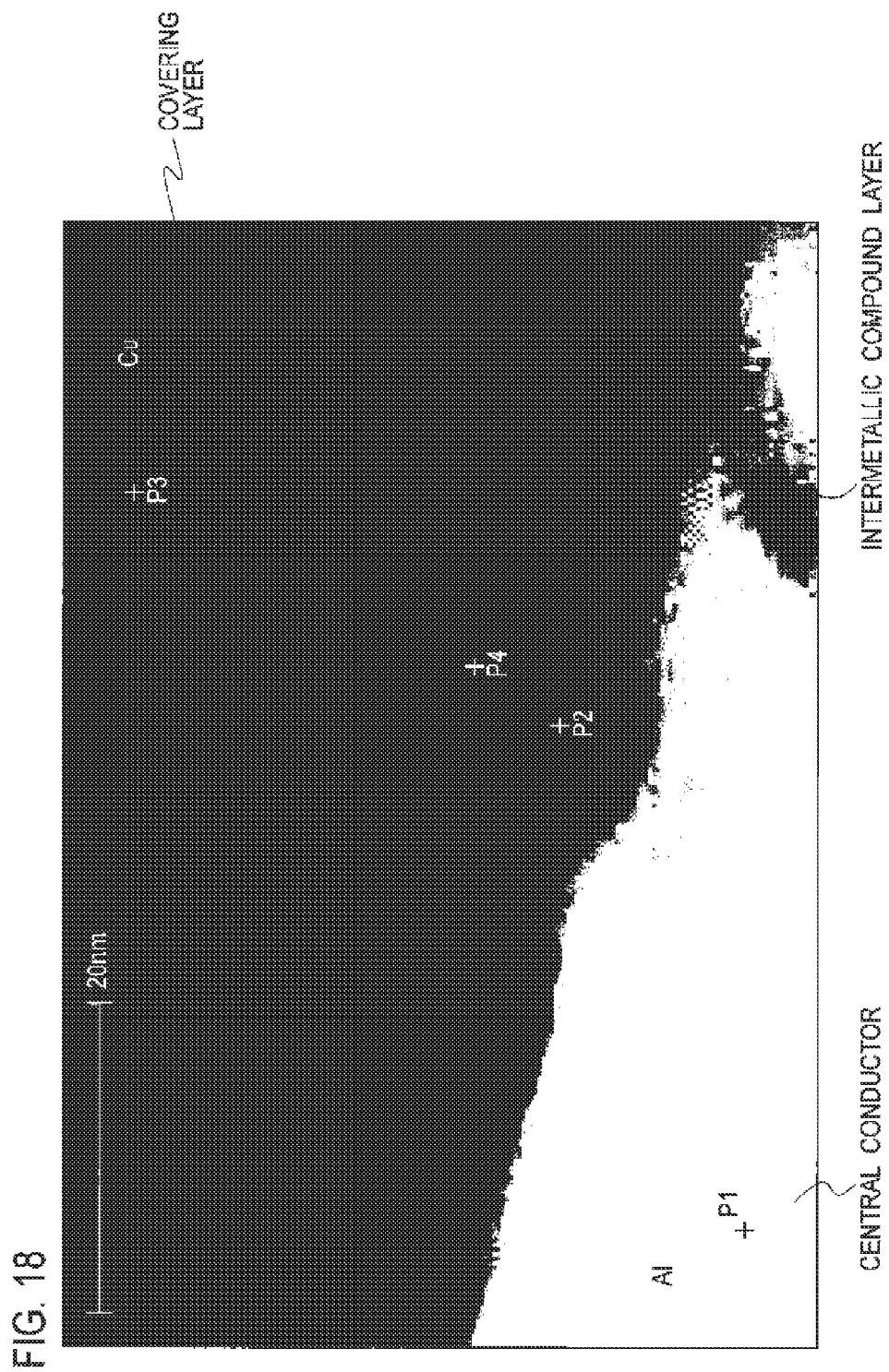
FIG. 18 is a photograph of an observation from a transmission electron microscope showing an interface between a covering layer and a central conductor according to Example 1 of the present invention.
Figure 19:
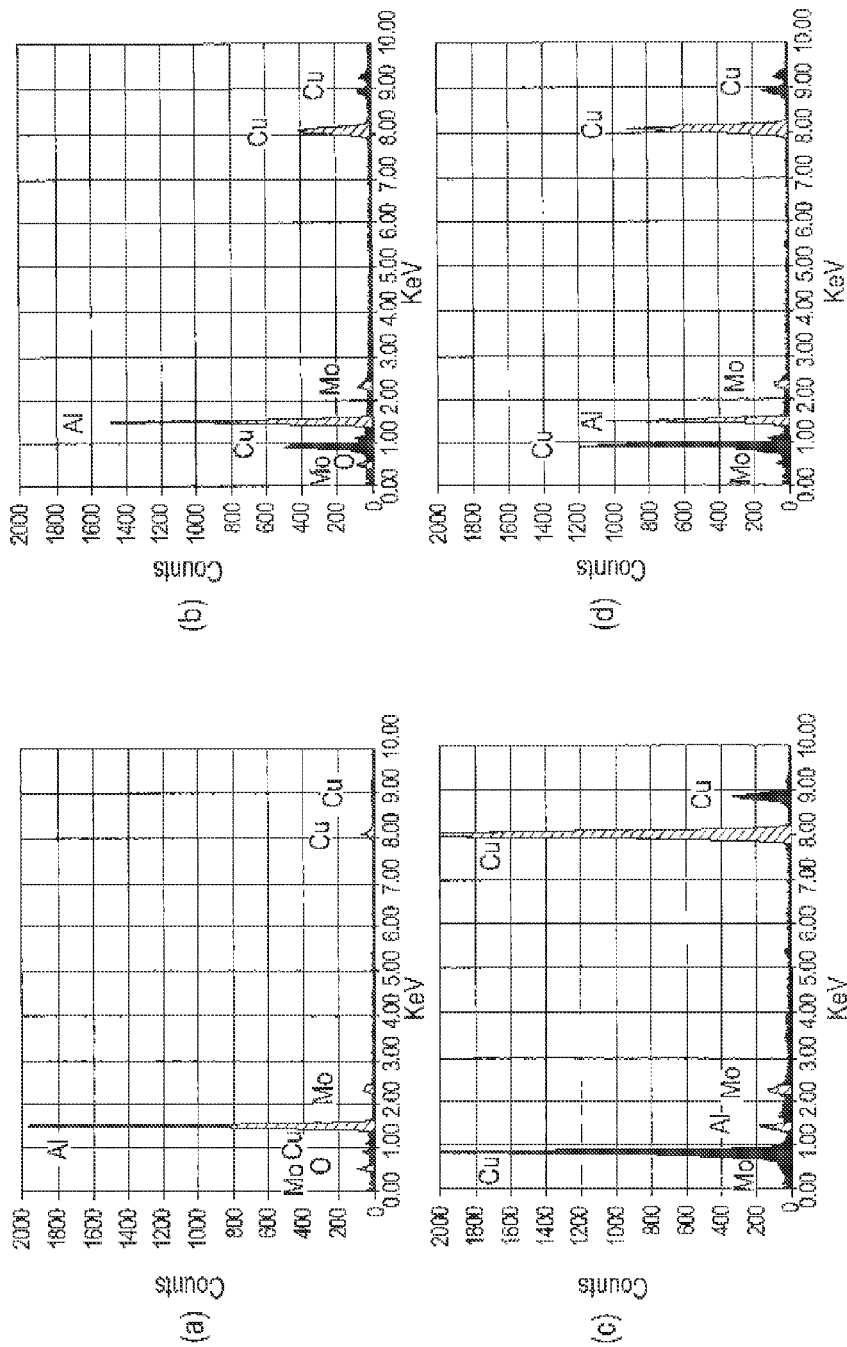
FIG. 19(a) is a graph (No. 1) showing an energy dispersive X-ray spectrometry (EDS) according to Example 1 of the present invention.
FIG. 19(b) is a graph (No. 2) showing an EDS according to Example 1 of the present invention.
FIG. 19(c) is a graph (No. 3) showing an EDS according to Example 1 of the present invention.
FIG. 19(d) is a graph (No. 4) showing an EDS according to Example 1 of the present invention.

FIG. 18 shows a TEM photograph of the 5% CCA wire. In FIG. 18, the dark area represents copper, the white area represents aluminum, and the gray area represents the intermetallic compound layer. It is evident from the FIG. 18 that the intermetallic compound layer 3 is generated in an excellent bonding condition so that the composition thereof is obliquely shifted from the central conductor 1 through the covering layer 2. FIGS. 19(*a*) to 19(*d*) respectively show results of point analysis from energy dispersive X-ray spectrometry (EDS) concerning point Pi in the central conductor 1, point P2 in the intermetallic compound layer 3 on the side of the central conductor 1, point P3 in the covering layer 2, and P4 in the intermetallic compound layer 3 on the side of the covering layer 2 shown in FIG. 18. As shown in FIG. 19(*b*), it was confirmed that aluminum atoms were rich in the intermetallic compound layer 3 on the side of the central conductor 1, and, as shown in FIG. 19(*d*), it was confirmed that copper atoms were rich in the intermetallic compound layer 3 on the side of the covering layer 2. From FIGS. 19(*a*) to 19(*d*), it is evident that metallic materials which constitute the intermetallic compound layer 3 are distributed obliquely from the central conductor 1 through the covering layer 2. Also, $Cu_9Al_4$ and $CuAl_2$ are main compositions of the intermetallic compound layer 3, and volume resistivity of thin and flat-shaped $Cu_9Al_4$ and $CuAl_2$ is approximately 10 μΩcm or higher. Since the volume resistivity of copper is 1.724 μΩcm, the volume resistivity of the intermetallic compound layer is at least 5 times larger than copper, which is thought to be a sufficient value.

Example 2

As shown in FIGS. 20(*a*) through 20(*c*), as an Example 2 of the present invention, winding wire is fabricated in which the 5% CCA wire drawn into 0.4 mm is covered with polyurethane (hereinafter, referred to as a "5% CCA winding wire"), and a reactor was fabricated which is provided with a magnetic core 32 and the 5% CCA winding wire 31 arranged around the magnetic core 32. The number of 5% CCA winding wires 31 used was 14, and the number of winding turns was 80. Also, as comparative examples, reactors using aluminum wires and copper wires were fabricated, respectively. Direct-current resistance and alternating-current resistance were measured using each of those reactors fabricated.

FIG. 21 shows properties of the 5% CCA winding wire according to Example 2 of the present invention in comparison with the aluminum winding wire and copper winding wire. Comparing the 5% CCA winding wire to the copper winding wire in a reactor in which inductances are adjusted to be substantially identical, it is understood that alternating-current resistance is decreased by almost half even if direct current resistance is 1.57 times higher.

Example 3

In addition to a reactor in which 5% CCA winding wires were used similarly to Example 2 of the present invention, reactors were fabricated as Example 3 of the present invention under the same conditions as the reactor in which the 5% CCA winding wires were used, by respectively using a winding wire of a high frequency cable illustrated in FIG. 1 in which a cross-sectional area of a covering layer 2 is 15% of the cross-sectional area of the entire cable (hereinafter, referred to as a "15% CCA winding wire"), a winding wire of a high frequency cable in which a cross-sectional area of a covering layer 2 is 10% of the cross-sectional area of the entire cable (hereinafter, referred to as a "10% CCA winding wire"), and a winding wire of a high frequency cable in which an aluminum alloy (JIS 6063 alloy) was used as a central conductor 1 and a cross-sectional area of a covering layer 2 is 5% of the cross-sectional area of the entire cable (hereinafter, referred to as an "alloyed aluminum 5% CCA winding wire").

Figure 22:
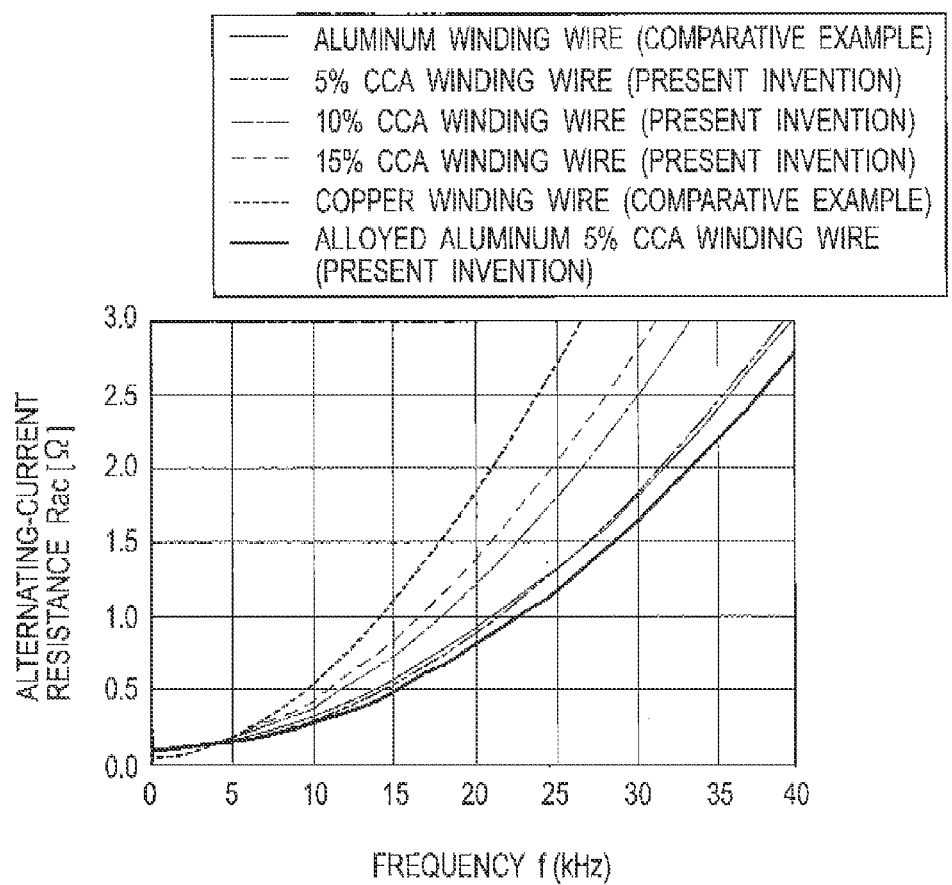
FIG. 22 is a graph showing properties (actual measured values) of a reactor according to Example 3 of the present invention.

FIGS. 22 and 23 show frequency characteristics of alternating-current resistance with regard to each of the 15% CCA winding wire, the 10% CCA winding wire, the 5% CCA winding wire, and the alloyed aluminum 5% CCA winding wire according to Example 3 of the present invention, as well as the copper winding wire and the aluminum winding wire according to the comparative example. From FIGS. 22 and 23, it is proved that alternating-current resistance is greatly reduced in the 15% CCA winding wire, the 10% CCA winding wire, and the 5% CCA winding wire, compared to the copper winding wire. Further, it is evident that alternating-current resistance is significantly reduced in the alloyed aluminum 5% CCA winding wire, compared to the copper winding wire and the aluminum winding wire.

Yet further, from the characteristic values of the 15% CCA winding wire, the 10% winding wire, the 5% winding wire, it is evident that the smaller the ratio of cross-sectional area of the covering layer 2 shown in FIG. 1 is, the smaller alternating-current resistance is. This was found out to be mitigation of proximity effect because the wire diameter had an equivalently reduced thickness of the covering layer 2 as the intermetallic compound layer 3 was generated, in addition to an effect of suppressing eddy currents. In theory, proximity effect is known to be proportional to the fourth power of a wire diameter.

Other Embodiments

The present invention has been described based on the foregoing embodiments, but it should not be understood that the description and drawings that are a part of this disclosure limit the present invention. From this disclosure, various alternative embodiments, examples, and operation techniques will be obvious to those skilled in the art.

Although a wire (single wire) was described as the high frequency cable according to the embodiment of the present invention, this wire may be used as a multi-core wire in which multiple wires are bunched or litz wire in which a plurality of wires are twisted together, and the multi-core wire and litz wire can also suppress alternating-current resistance even more effectively.

Moreover, the high frequency cable according to the embodiment of the present invention may be applied to various devices such as a high frequency transformer, a motor, a reactor, a choke coil, induction heating equipment, a magnetic head, a high frequency feed cable, a DC power supply unit, a switching power supply, an AC adapter, a displacement detecting sensor and a flaw detecting sensor for an eddy current detection method and the like, an IH cooking heater, a non-contact power supply system such as a coil, a feed cable or the like, a high frequency current generator, or the like.

When the high frequency cable according to the embodiment of the present invention is deformed in the case where the high frequency cable is made into a coil or used as litz wire, the High frequency cable is deformed without performing a thermal treatment in order to maintain the worked structure thereof (fiber-like structure in the longitudinal direction). Also, a thermal treatment may be carried out at a temperature lower than a recrystallizing temperature in order to raise resistance values of the central conductor 1 and the covering layer 2. In case where a thermal treatment is conducted, the high frequency cable may be deformed during the thermal treatment, or may be deformed before the thermal treatment. Further, a thermal treatment may be performed on the high frequency cable entirely or locally.

As explained above, it is naturally understood that the present invention include various embodiments that are not described herein. Therefore, the technical scope of the present invention is defined only by the invention-defining matters according to the reasonable scope of the claims of the invention.

INDUSTRIAL APPLICABILITY

The high frequency cable and the high frequency coil of the present, invention may be used in electronic device industries including manufacturing of various devices such as a high frequency transformer, a motor, a reactor, a choke coil, induction heating equipment, a magnetic head, a high frequency feed cable, a DC power supply unit, a switching power supply, an AC adapter, a detecting sensor and a flaw detecting sensor for an eddy current detection method and the like, an IH cooking heater, a non-contact power supply system which includes a coil, a feed cable or the like, a high frequency current generator, or the like.

What is claimed is:

1. A high frequency cable, comprising:
   a central conductor made from aluminum or an aluminum alloy;
   a covering layer made from copper covering the central conductor, and having a fiber-like structure in a longitudinal direction; and
   an intermetallic compound layer formed between the central conductor and the covering layer and having greater volume resistivity than the covering layer, wherein a cross-sectional area of the covering layer is 15% or less of an entire cross-sectional area including the central conductor, the intermetallic compound layer and the covering layer, and
   wherein a thickness of the intermetallic compound layer is between 10 nm and less than 1 μm.

2. The high frequency cable according to claim 1, wherein the intermetallic compound layer is formed so as to shift such that a composition thereof obliquely shifts from the central conductor through the covering layer.

3. The high frequency cable according to claim 1, wherein the intermetallic compound layer is formed by wire drawing of the central conductor covered by the covering layer using dies at multiple steps, each of the dies having a cross-section reduction rate of 20% or higher.

4. The high frequency cable according to claim 1, wherein volume resistivity of the intermetallic compound layer is 10 μΩcm or higher.

5. A high frequency coil using a high frequency cable,
   wherein the high frequency cable comprises:
   a central conductor made from aluminum or an aluminum alloy;
   a covering layer made from copper covering the central conductor, and having a fiber-like structure in a longitudinal direction; and
   an intermetallic compound layer formed between the central conductor and the covering layer and having greater volume resistivity than the covering layer, and
   a cross-sectional area of the covering layer is 15% or less of an entire cross-sectional area which includes the central conductor, the intermetallic compound layer and the covering layer, and
   wherein a thickness of the intermetallic compound layer is between 10 nm and less than 1 μm.

* * * * *